United States Patent [19]
Falls et al.

[11] Patent Number: 5,321,951
[45] Date of Patent: Jun. 21, 1994

[54] INTEGRAL COMBUSTOR SPLASH PLATE AND SLEEVE

[75] Inventors: Stephen W. Falls, Cincinnati; Eric J. Kress, Loveland; Joseph F. Savelli, West Chester; James N. Cooper, Hamilton; Byron A. Pritchard, Jr., Loveland, all of Ohio

[73] Assignee: General Electric Company, Cincinnati, Ohio

[21] Appl. No.: 89,058

[22] Filed: Jul. 8, 1993

Related U.S. Application Data
[63] Continuation of Ser. No. 860,332, Mar. 30, 1992, abandoned.

[51] Int. Cl.5 .......................... F23R 3/60; F02C 7/22
[52] U.S. Cl. ........................................ 60/748; 60/740
[58] Field of Search ................ 60/748, 737, 747, 756, 60/752, 39.32, 740, 39.37; 239/404, 405, 406

[56] References Cited

U.S. PATENT DOCUMENTS

| | | | |
|---|---|---|---|
| 4,180,974 | 1/1980 | Stenger et al. | 60/756 |
| 4,246,758 | 1/1981 | Caruel et al. | 60/747 |
| 5,117,637 | 6/1992 | Howell et al. | 60/748 |
| 5,123,248 | 6/1992 | Monty et al. | 60/748 |

Primary Examiner—Richard A. Bertsch
Assistant Examiner—Timothy S. Thorpe
Attorney, Agent, or Firm—Jerome C. Squillaro; Charles L. Moore, Jr.

[57] ABSTRACT

A carburetor for the combustor of a gas turbine engine wherein a swirler and a venturi cooperate to atomize and mix air and fuel for the combustor, wherein a downstream mounted integrally formed sleeve and splash plate is provided to control the flow of the air/fuel mixture into the combustor. The integral splash plate and sleeve has protuberances formed on its upstream surface to increase the area impinged by cooling air and thereby enhance cooling of the splash plate flange thereof.

8 Claims, 6 Drawing Sheets

INTEGRAL COMBUSTOR SPLASH PLATE AND SLEEVE

This application is a continuation of application Ser. No. 07/860,332, filed Mar. 30, 1992 now abandoned.

FIELD OF THE INVENTION

The present invention relates generally to gas turbine engine combustors and, more particularly, to an integral splash plate and sleeve construction in the combustor apparatus and the cooling thereof.

BACKGROUND OF THE INVENTION

Combustors used in gas turbine engines, such as aircraft engines, conventionally include sheet metal combustion liners and sheet metal combustion dome assemblies. The combustion liners include coannular outer and inner combustion liners joined at their upstream ends by an annular dome for defining therein an annular combustion dome. The dome includes a plurality of circumferentially spaced carburetors or fuel cup assemblies for providing a fuel/air mixture into the combustor which is conventionally ignited for generating combustion gases. The combustor is supplied with compressed airflow from the compressor upstream thereof.

A conventional combustor carburetor is exemplified by the showing of R. E. Stenger, E. E. Ekstedt, and S. P. Seto U.S. Pat. No. 4,180,974 entitled Combustor Dome Sleeve, issued Jan. 1, 1980, and assigned to the assignee of the present application. The teaching of this patent is specifically intended to be incorporated herein by reference for enabling one skilled in the art to understand the present invention without the disclosure of extraneous material. Such conventional combustor carburetor includes a fuel injector, a venturi, a primary and a secondary swirler and a separate sleeve and splash plate which is closely spaced from a dome. The individual functions of such conventional elements are known to the expert in the art and have been documented widely in addition to the above referenced patent.

It is also well-known to arrange the carburetor devices in cylindrical can-type, or single or double dome annular combustors.

OBJECTS AND SUMMARY OF THE INVENTION

Accordingly, it is an object of the present invention to provide a new and improved carburetor device for the combustor of a gas turbine engine.

Accordingly, it is another object of the present invention to provide a new and improved carburetor device for a single dome-type combustor of a gas turbine engine.

It is still another object of the present invention to provide a new and improved carburetor device for a double dome-type combustor of a gas turbine engine.

It is a further object of the present invention to provide a new and improved carburetor device for the combustor of a gas turbine engine which has relatively few components, as well as fewer joints between the components resulting in reduced overall assembly diameter.

It is still a further object of the present invention to provide a new and improved carburetor device for the combustor of a gas turbine engine, wherein predetermined critical portions of the carburetor device are cooled by impingement of a cooling air stream, and wherein the surfaces of such critical portions are specially prepared to further enhance such cooling.

Accordingly, the present invention provides a new and improved carburetor device or fuel cup assembly for the combustor of a gas turbine engine, wherein the sleeve and splash plate are integrally formed, thereby reducing the number of components in the carburetor device, lightening its weight, reducing the number of the necessary joints between these components, and reducing the overall assembly diameter.

Accordingly, the present invention further provides a new and improved carburetor device or fuel cup assembly for the combustor of a gas turbine engine, wherein the sleeve and splash plate are integrally formed and portions thereof are cooled by the impingement of a cooling air stream on an impingement surface prepared to enhance such cooling.

BRIEF DESCRIPTION OF THE DRAWINGS

The present invention will become more readily apparent from the following description of a preferred embodiment thereof, shown and illustrated by way of example, and described in reference to the accompanying drawings, in which.

DESCRIPTION OF THE PREFERRED EMBODIMENT

Figure 1:
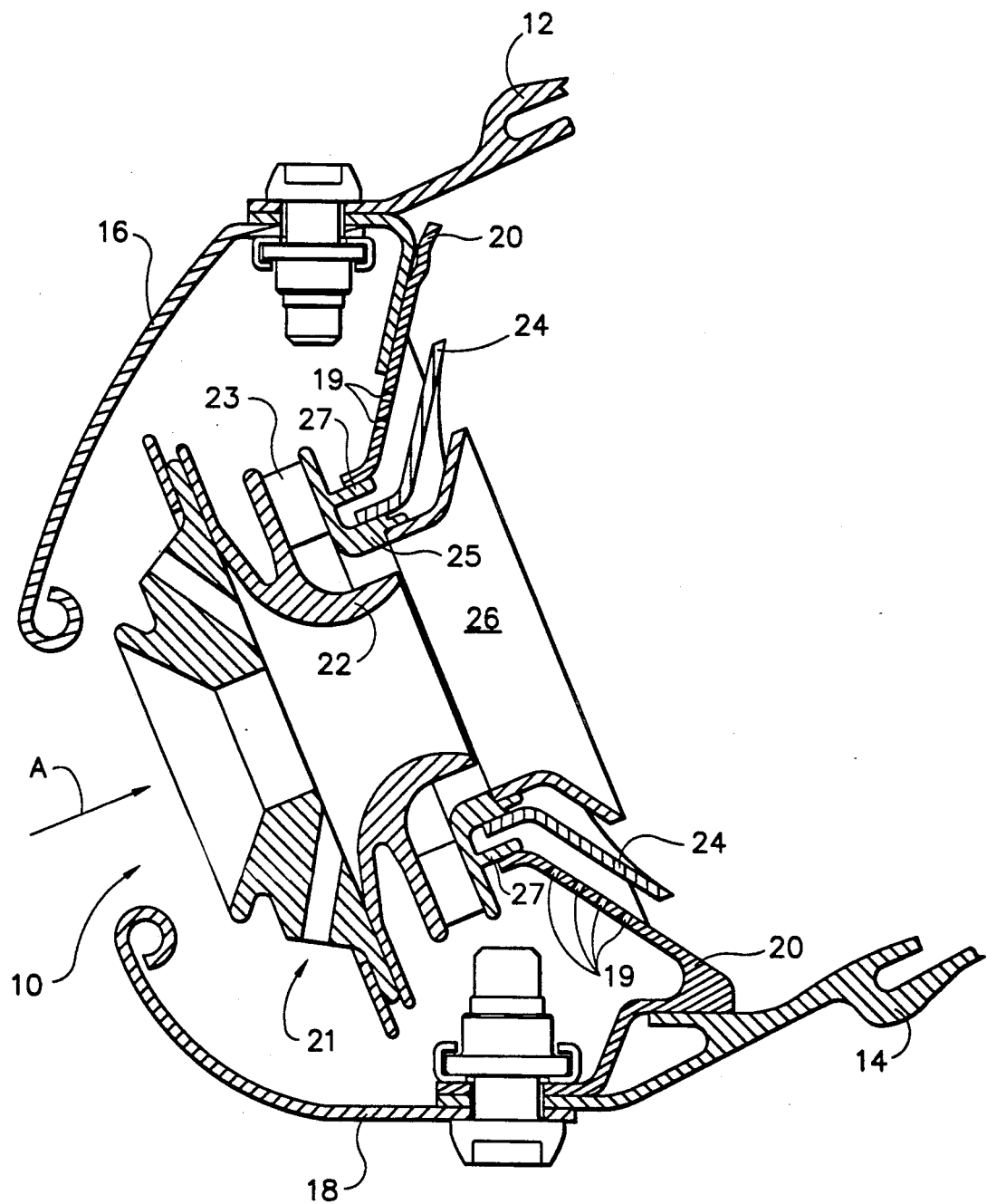
FIG. 1 illustrates schematically and partly in section a prior art carburetor device or fuel cup assembly incorporated into a single dome structure.

Referring to the drawings, and particularly to FIG. 1, it is seen that the state of the art carburetor device (or fuel cup assembly) 10 for the combustor of a gas turbine engine includes, in combination with the dome structure into which it is mounted, an outer liner 12, an inner liner 14, an outer cowl 16, inner cowl 18, and a dome structure 20 including holes 19 formed therein. The compressed air is introduced into carburetor device 10 from a compressor (not shown) in a direction generally indicated by arrow A of FIG. 1. The compressed air is first introduced into a primary swirler 21, then into a venturi 22 where it is mixed with the liquid particles of the fuel emanating from a fuel nozzle (not shown) in a swirling motion with respect to the axial and downstream direction. As the mixture further proceeds axially within venturi 22, it interacts with the airstream introduced in a rotational swirl of the opposite direction by a secondary swirler 23. The interaction between the two airstreams acts to finely atomize the fuel and readies it for combustion in the combustion chamber (not shown) of the combustor. It is pointed out that a portion of the airflow will pass through holes 19 in dome 20 and will impinge on the flat upstream surface of splash plate 24.

As further can be seen from the showing of FIG. 1, an annular sleeve 26 extends axially in the downstream direction and is joined at its upstream end to a flange portion 25 of secondary swirler 23. Splash plate 24, which is a flared trumpet-like structure, also extends axially and outwardly, and is joined to an upper portion of flange 25. Dome structure 20 also extends trumpet-like in the axial direction and is joined to a second flange portion 27 of secondary swirler 23 as can be seen in FIG. 1. It should be particularly noted in FIG. 1 that a triple joint is necessary for the separate components; namely, sleeve 26, splash plate 24 and dome structure 20. The present invention is directed to reduce the number of components and their required attachment points at this critical region of carburetor 10.

Figure 2:
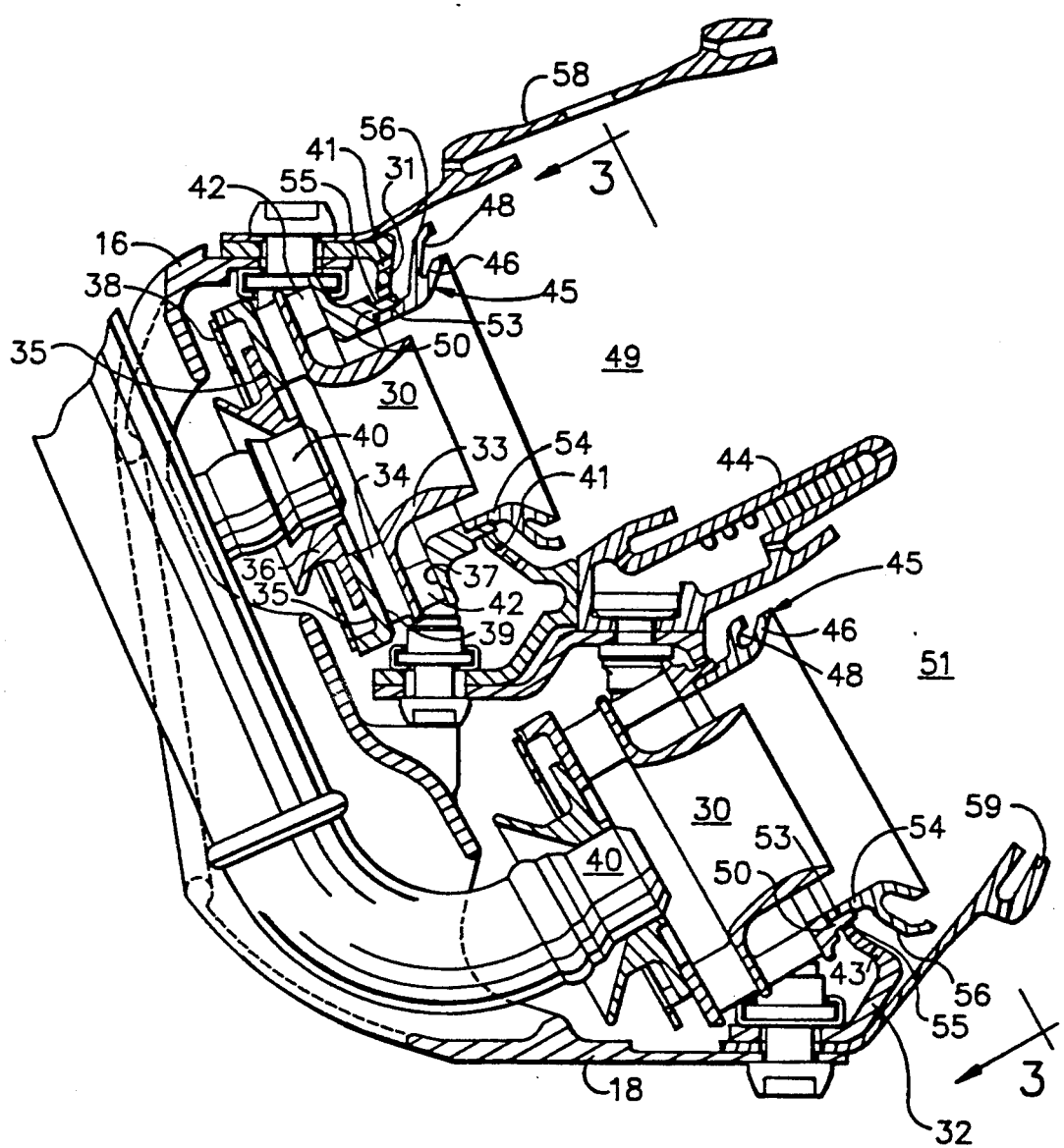
FIG. 2 illustrates the carburetor device or fuel cup assembly schematically and partly in section according to the present invention in an exemplary double dome-type combustor arrangement.

Turning now to FIG. 2, wherein features of the present invention are incorporated, it is noted that the inventive fuel cup assembly or carburetor device 30 is exemplarily illustrated in a double dome-type combustor including an outer dome structure 31 and an inner dome structure 32. However, the new and improved single carburetor 30, can be mounted into a single dome structure as well, such as illustrated in the referenced patent and in FIG. 1.

As it is well known in the art, there is a sliding interface 35 between a ferrule 36 and primary swirler 34 and a fuel nozzle 40 slides into the central opening in ferrule 36. Ferrule 36 is urged against primary swirler 34 by air pressure and kept in place by a retaining ring 38 so that a slight clearance remains between ferrule 36 and retaining ring 38. Venturi 33, secondary swirler 42 and primary swirler 34 are joined by brazing in the regions indicated at 37 and 39. It is noted that venturi 33 and swirlers 34 and 42 may also be made from a single casting. As can be seen in FIG. 2, a plurality of holes 41 and 43 are provided in outer and inner domes 31 and 32, respectively. These holes are shown in greater detail in FIGS. 5 and 6. The air flowing through holes 41 and 43 impinges on a surface of an integral splash plate/sleeve 45 for cooling it, as will be described in more detail in connection with FIGS. 5 and 5A hereinafter.

The sleeve and splash plate are formed, according to the present invention, as an integral cast piece 45 with flared flanges 46 and 48 performing the functional requirements of separate sleeve 26 and splash plate 24 shown in FIG. 1. As can be seen in FIG. 2, integral sleeve/splash plate 45 is joined by a body portion 54 to a single flange portion 50 of secondary swirler 42 by brazing at region 53, while outer dome 31 is also joined to flange portion 50 at region 55 by brazing.

It follows from the above description that only a single-joint attachment is required for attaching integrally formed sleeve/splash plate 45 to flange 50 of secondary swirler 42. A second single-joint is required for attaching either outer or inner domes 31 or 32 to flange 50 to form a reliable structure. Accordingly, the assembly diameter of carburetor device 30 is reduced when compared with the prior art device of FIG. 1. This becomes especially significant in a double dome construction as can be seen in FIG. 2.

Integral sleeve/splash plate 45 is preferably made from a single casting as opposed to the prior art separate splash plate 24 and sleeve 26, which are both made from sheet metal. As it is well known, a minimum bend radius is required in forming sheet metal components to prevent extreme thinning of the sheet metal at the bend. This requirement necessitates and increases the overall dimensions of the formed element which, when applied to the structure of FIG. 1, evidences itself in the increased overall diameter of the assembled devices.

Further, domes 31 and 32 are continuous rings and are brazed to their respective associated secondary swirlers 42 at regions 55. Each of domes 31 and 32 in FIG. 2 is a machined ring which also contributes to the reduced overall assembly diameter as opposed to a sheet metal construction which is the case in the FIG. 1 structure.

As also depicted in FIG. 2, a double dome-type combustor is separated into an outer combustion zone 49 and an inner combustion zone 51 by a centerbody 44 which can be of a conventional construction. However, a preferred embodiment for centerbody 44, shown in FIG. 2, is the subject of a separate patent application Ser. No. 07/859,760, commonly owned by the assignee hereof and filed concurrently herewith; such patent application being hereby incorporated by reference. The various group of elements are joined by conventional bolts as shown.

Figure 3:
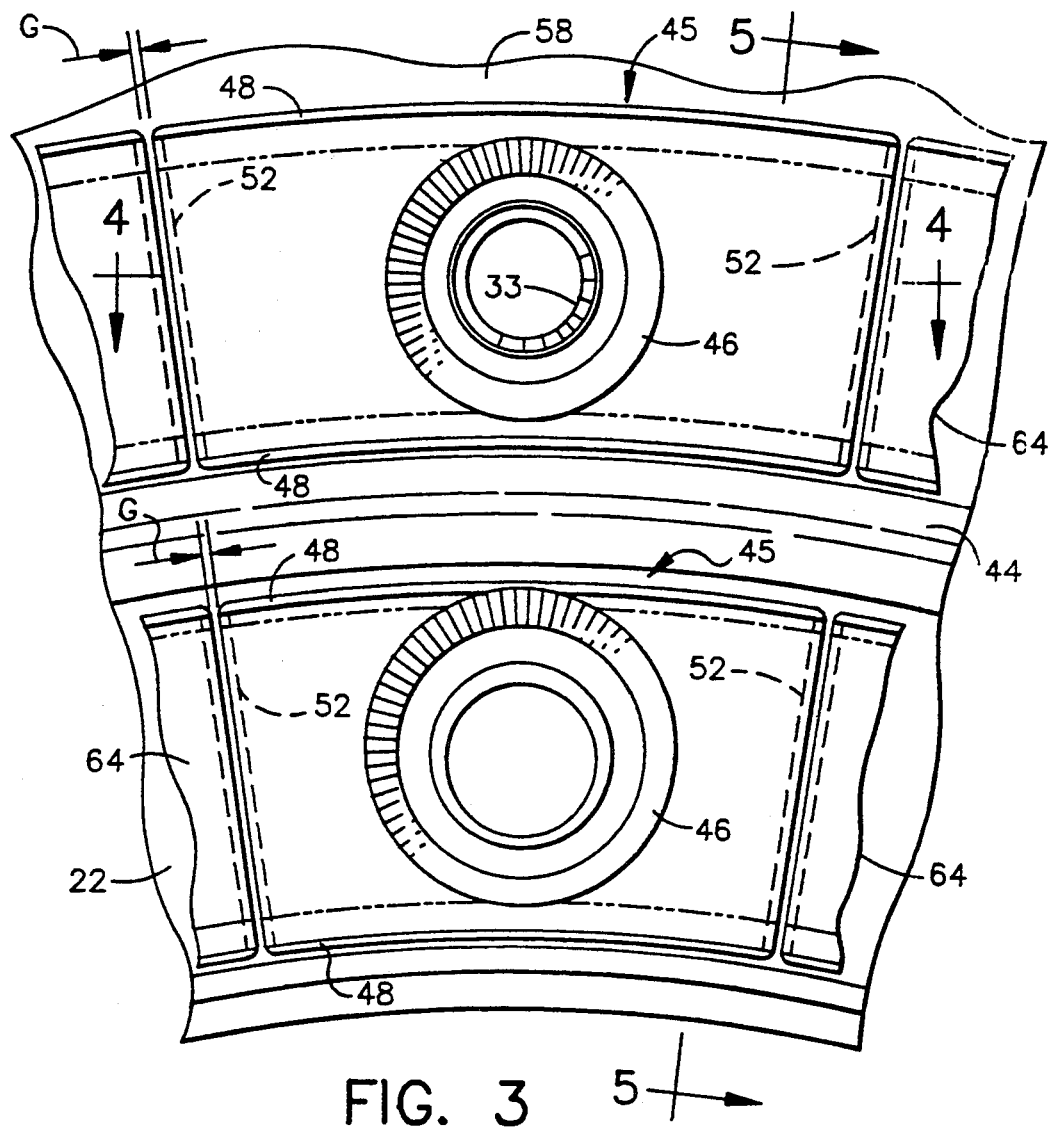
FIG. 3 is a view, partly in section, of the carburetor devices and their associated mounting structures, taken along the arrows 3—3 in FIG. 2.
Figure 4:
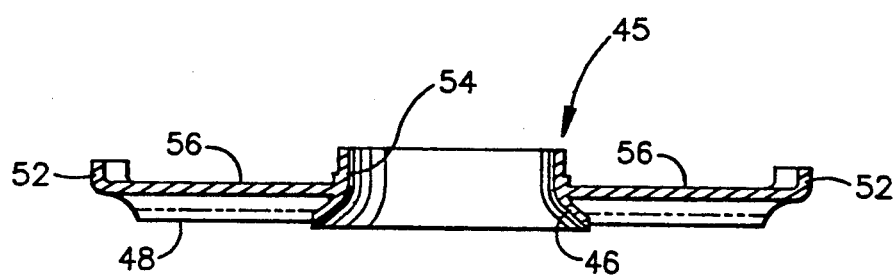
FIG. 4 is a sectional view of the carburetor device taken along the section line 4—4 in FIG. 3.

With reference to FIGS. 3 and 4, it is seen that sleeve flange 46 is circular or trumpet-like, with splash plate flange 48 extending circumferentially along the inner and outer edge of each integral splash plate/sleeve 45. Integral splash plate/sleeve 45 includes a body portion 54 that extends axially upstream from sleeve flange 46. Adjacent splash plate flanges 48 are closely spaced and are separated by a gap G, as shown in FIG. 3. A feature of the inventive integral splash plate/sleeve 45 is the addition of air dams 52, which extend upstream from upstream surface 56 of splash plate flange 48. Air dams 52 help prevent cooling air passing through holes 41 and 43 from flowing unimpeded through gaps G between adjacent splash plate flanges 48, but instead encourage impingement on surface 56 and flow thereover to cool splash plate flanges 48, outer liner 58, inner liner 59 and centerbody 44. Therefore, the impingement air is conserved to more efficiently cool upstream surface 56 of integral splash plate/sleeve 45, as well as prevent cooling air from flowing into combustion zones 49 and 51 (thereby improving combustion efficiency, ignition and flame propagation).

Figure 5:
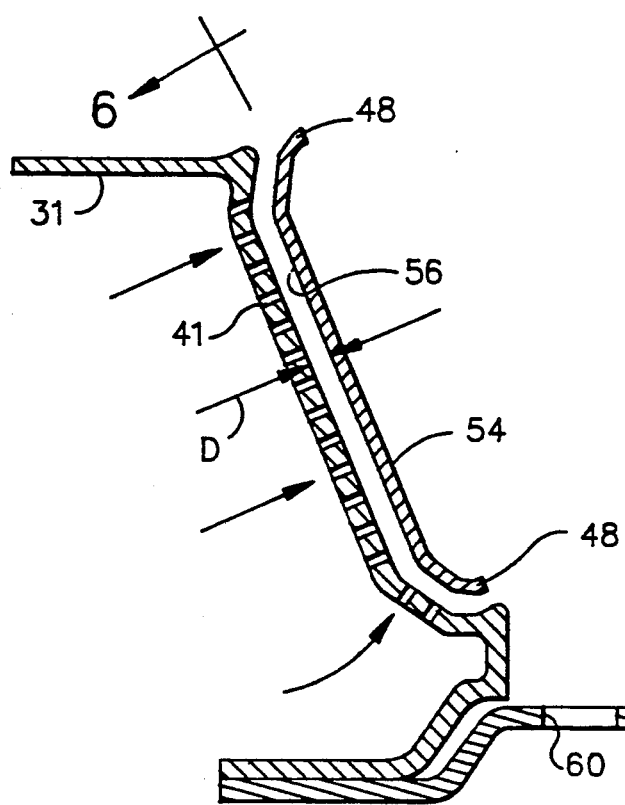
FIG. 5 is a sectional view through the dome and the body portion of the splash plate of the carburetor device taken along section line 5—5 in FIG. 3.
Figure 5:
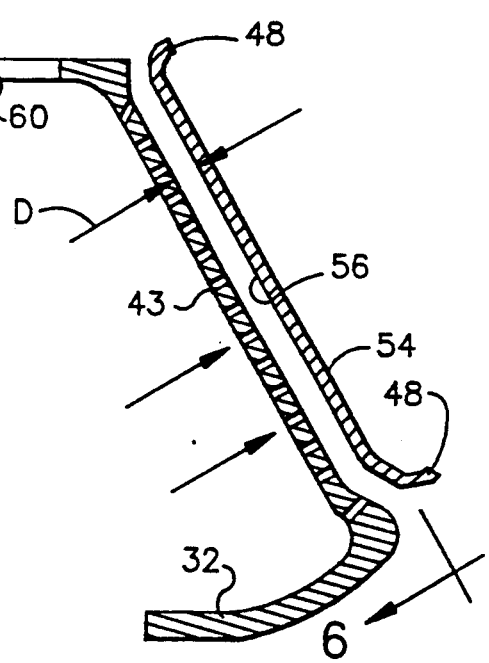

With reference to FIG. 5, which is a cross-sectional view through domes 31 and 32 and splash plate flange 48, it is seen that air flowing through holes 41 and 43 in the respective dome portions 31 and 32 impinges on surfaces 56 of splash plate flanges 48. There is a distance D provided between domes 31 and 32 and surface 56 of their associated splash plate flanges 48 in order to maintain proper cooling flow.

Figure 5A:
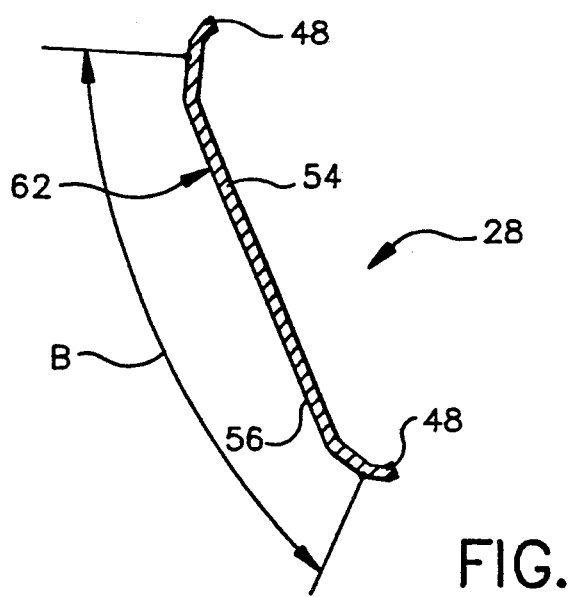
FIG. 5A is a partial sectional view of the body portion of the splash plate illustrated in FIG. 5.
Figure 5B:
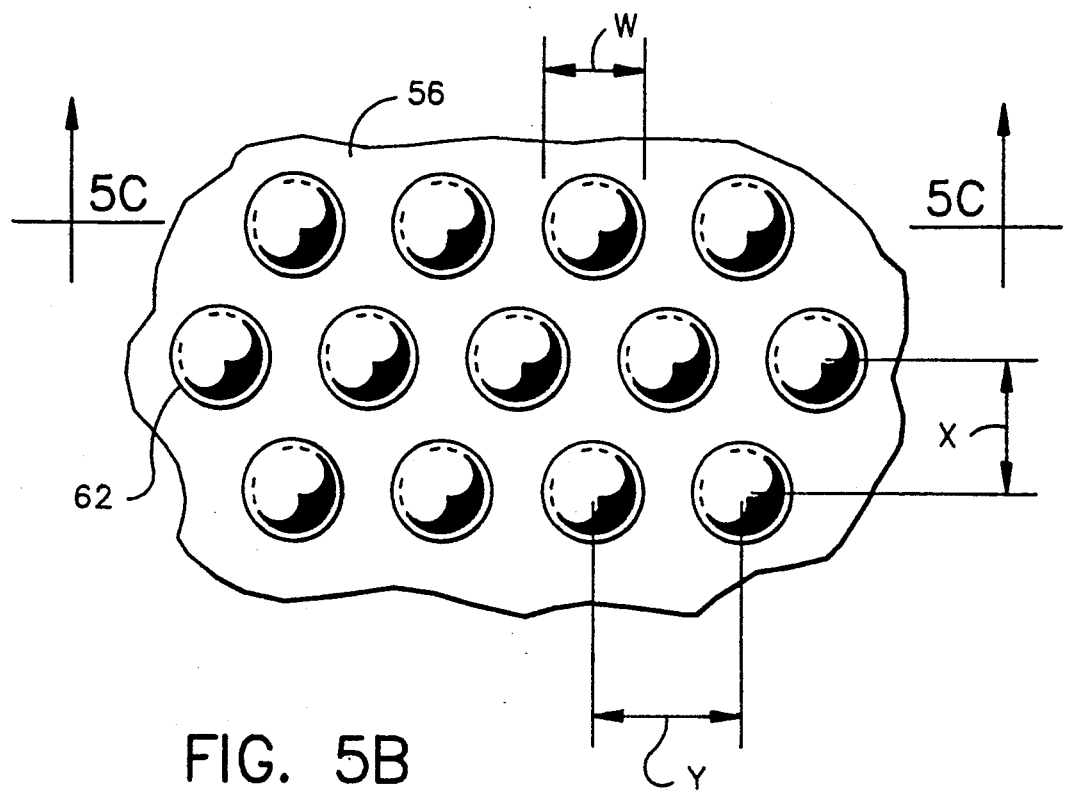
FIGS. 5B-C illustrate schematically and in partial section views the surface treatment of the splash plate to enhance cooling thereof.
Figure 5C:
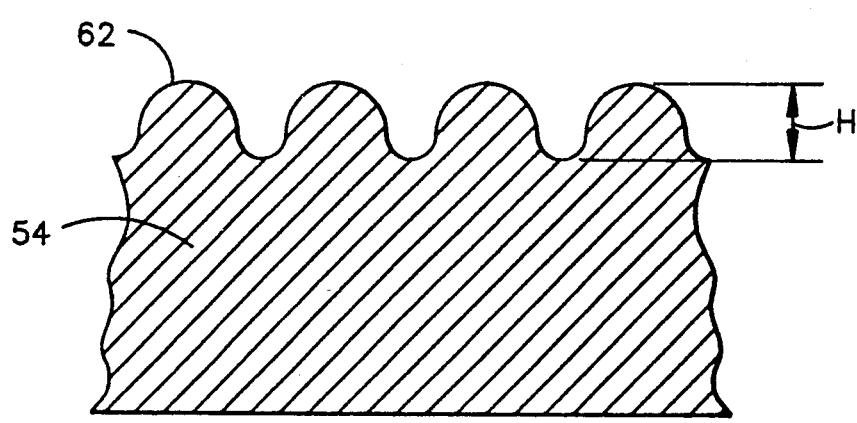

FIGS. 5A–C illustrate a treatment to surface 56 which enhances the impingement cooling of splash plate flanges 48. Surface 56 is textured with a plurality of protuberances (or bumps or dimples) 62 which are spaced apart on surface 56. Arcuate arrow B in FIG. 5A shows the extent of the placement of protuberances 62 on surface 56. FIGS. 5B–C illustrate the preferred dimensions and spacing of protuberances 62, which are generally hemispherical in shape as can be seen in FIG. 5C. Dimensions x and y in FIG. 5B illustrate the spacing of protuberances 62, where dimension x represents spacing in a generally radial direction and dimension y represents spacing in a generally circumferential direction. The width w of each protuberance 62 is generally the same as its height H, but may be slightly larger. Protuberances 62 are preferably integrally cast on surface 56, but they could also be formed as part of a sintering process, through laser weld build-up, or by machining operations.

Protuberances 62 provide increased surface area for convection cooling of splash plate flange 48. The textured surface can also act to increase the convective heat transfer coefficient of the flow of impingement air over surface 56 by promoting turbulence in the flow over surface 56. Protuberances 62 offer an advantage over known cooling ribs and pins, in that they are generally smaller in size when compared to ribs and fins, such as those taught in copending and concurrently filed patent application Ser. No. 07/859,911, which is also assigned to the assignee of this invention.

Moreover, protuberances 62 do not add significant resistivity to conductive heat transfer through splash plate 48. Heat flux from the high temperature downstream side of splash plate flange 48 must travel by conduction through the thickness of splash plate flange 48, and then by convection at surface 56. Protuberances 62 improve the convective heat transfer characteristics of surface 56, with minimal reduction in heat transfer by conduction through the thickness of splash plate 48. An example for the cooling with a textured surface is disclosed in copending and concurrently filed patent application Ser. No. 07/860,397, "COOLING ENHANCED IMPINGEMENT COOLED COMPONENTS," which is also assigned to the assignee of this application.

Figure 6:
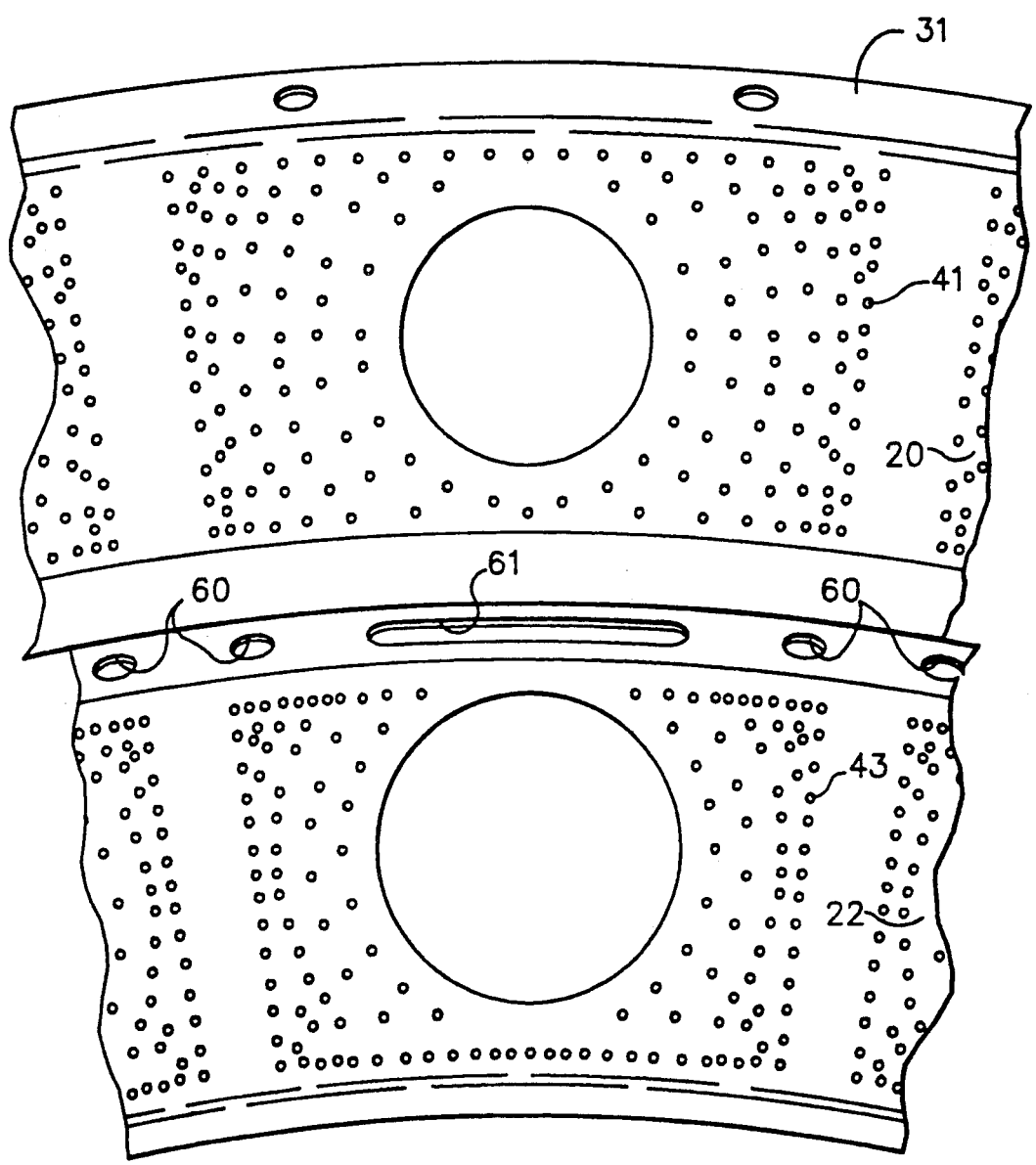
FIG. 6 is a partial view of the domes taken along section line 6—6 in FIG. 5, wherein the distribution pattern of the impingement holes for the cooling air is shown.

FIG. 6 shows the impingement hole pattern in domes 31 and 32. Holes 41 and 43 are concentrated at the corners of splash plate flange 48, since the edges of the splash plate flange 48 will tend to be relatively hot compared to other portions thereof. Bolt holes 60 are provided for the connection of domes 31 and 32 to centerbody 44, as can be seen also in FIG. 5. An oblong hole 61 is an air passageway for conducting air downstream of domes 31 and 32 into the centerbody 44.

While there has been described herein what is considered to be a preferred embodiment of the present invention, other modifications of the invention shall be apparent to those skilled in the art from the teaching herein and, it is, therefore, desired to be secured in the appended claims all such modifications as fall within the true spirit and scope of the invention.

Accordingly, what is desired to be secured by Letters Patent of the United States is the invention as defined and differentiated in the appended claims.

What is claimed is:

1. A combustor for a gas turbine engine, comprising:
   (a) a plurality of carburetors for receiving and mixing fuel and compressed air, said carburetors including:
      (i) a primary radial swirler;
      (ii) a secondary radial swirler mounted axially downstream of said primary swirler, said secondary swirler including a flange formed thereon; and
      (iii) a one-piece sleeve and splash plate for controlling the flow of an air/fuel mixture into a chamber of said combustor including an axially extending body portion having an upstream end and a downstream end, a trumpet-like sleeve flange and a splash plate flange extending radially outwardly from said body portion downstream end and said body portion upstream end being fixedly joined to said secondary swirler flange; and
   (b) at least one annular dome plate having a plurality of openings therein for mounting said carburetors therein, said dome plate being fixedly joined to said secondary swirler flange.

2. The combustor as claimed in claim 1, wherein said dome plate includes a plurality of holes therein to impingement cool said one-piece sleeve and splash plate.

3. The combustor as claimed in claim 1, wherein said one-piece sleeve and splash plate is a single cast member.

4. The combustor as claimed in claim 1, wherein said splash plate flange extends proximate to adjacently mounted carburetors on each side and forms a gap with each splash plate flange of said adjacent carburetors, said splash plate flange including an air dam formed on each edge portion thereof for preventing cooling air from flowing through said gaps.

5. The combustor as claimed in claim 2, wherein said holes in said dome plate are arranged in a predetermined pattern with a concentration of said holes in a region lying opposite to said edge portions and to corner portions of said splash plate flange.

6. The combustor as claimed in claim 5, said splash plate flange further comprising a body portion having an upstream and a downstream facing major surface, wherein protuberances are formed on said upstream surface of said body portion to increase the area of said upstream surface being impinged by cooling air flowing through said holes, whereby cooling of said splash plate flange is enhanced.

7. The combustor as claimed in claim 1, wherein said dome plate is a single dome structure.

8. The combustor as claimed in claim 1, wherein said dome plate is a double dome structure.

* * * * *